United States Patent
Araie et al.

(10) Patent No.: US 10,330,925 B2
(45) Date of Patent: Jun. 25, 2019

(54) GALVANOMETER SCANNER

(71) Applicant: Sodick Co., Ltd., Kanagawa (JP)

(72) Inventors: Ichiro Araie, Kanagawa (JP); Mitsuru Murai, Kanagawa (JP); Taro Hasegawa, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 15/814,550

(22) Filed: Nov. 16, 2017

(65) Prior Publication Data

US 2018/0136459 A1 May 17, 2018

(30) Foreign Application Priority Data

Nov. 16, 2016 (JP) .................. 2016-223619

(51) Int. Cl.
  *G02B 26/10* (2006.01)
(52) U.S. Cl.
  CPC .................. *G02B 26/105* (2013.01)
(58) Field of Classification Search
  None
  See application file for complete search history.

(56) References Cited

U.S. PATENT DOCUMENTS

| | | | |
|---|---|---|---|
| 2011/0012875 A1 | 1/2011 | Sakakibara et al. | |
| 2011/0147606 A1* | 6/2011 | Bragagna | G02B 26/105 250/396 R |
| 2012/0013915 A1 | 1/2012 | Okamura et al. | |
| 2016/0261798 A1 | 9/2016 | Ishikawa et al. | |

FOREIGN PATENT DOCUMENTS

| | | |
|---|---|---|
| JP | 2009-244796 A | 10/2009 |
| JP | 2012-121038 A | 6/2012 |
| JP | 5275880 B2 | 8/2013 |
| JP | 5705390 B1 | 4/2015 |
| JP | 5729622 B2 | 6/2015 |
| JP | 2016-186129 A | 10/2016 |

\* cited by examiner

*Primary Examiner* — Jennifer D. Carruth
(74) *Attorney, Agent, or Firm* — Maier & Maier, PLLC

(57) ABSTRACT

According to the present invention, a galvanometer scanner, comprising: an operation portion having a rotary shaft; an inner sliding member configured to rotatably support the rotary shaft; a reaction force absorbing portion, provided outside the rotary shaft via the inner sliding member, configured to replace a force acting against the operation portion with an angular acceleration; an outer sliding member configured to rotatably support the reaction force absorbing portion; and a fixed portion provided outside the reaction force absorbing portion via the outer sliding member, is provided.

2 Claims, 1 Drawing Sheet

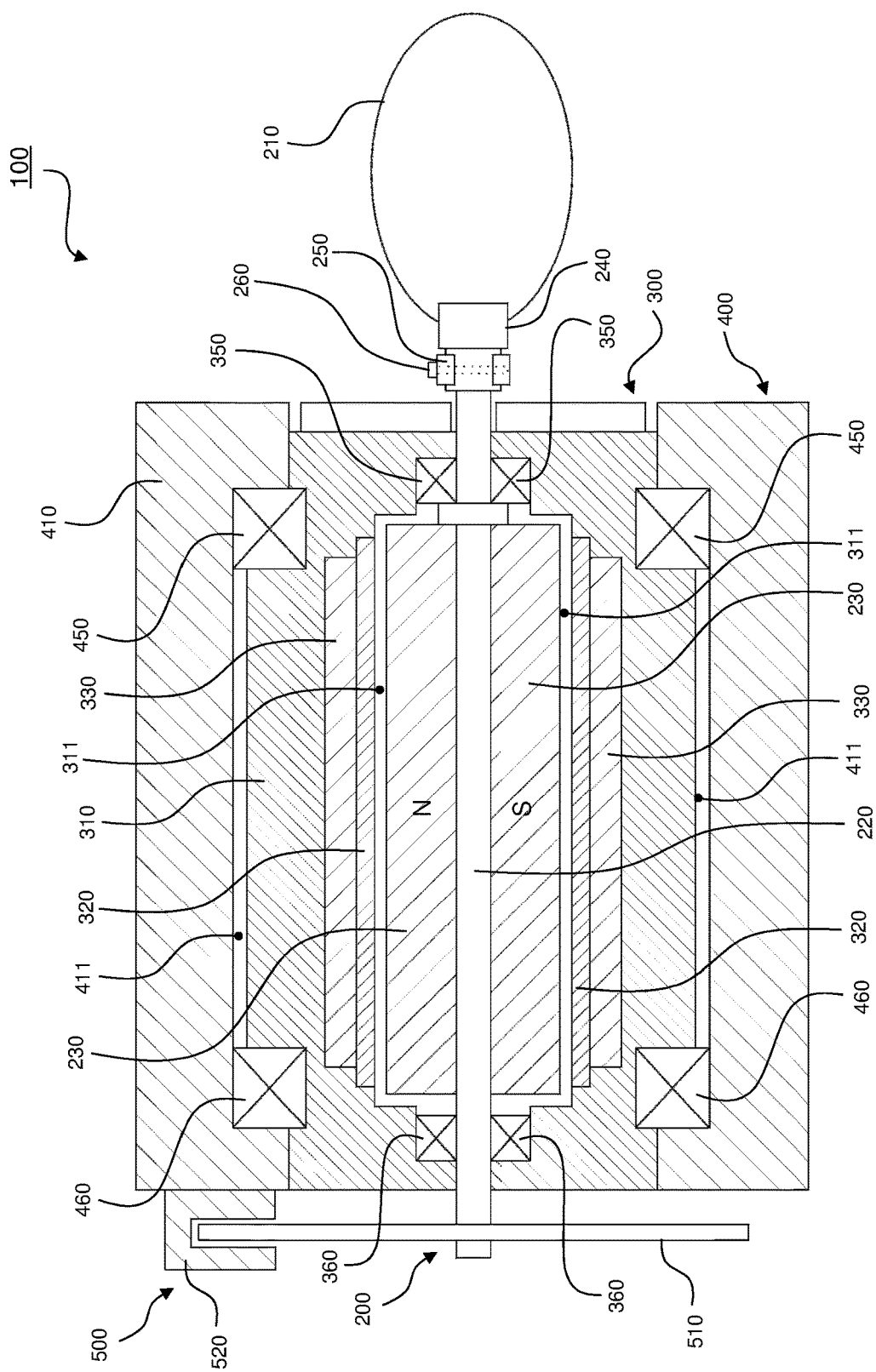

GALVANOMETER SCANNER

BACKGROUND OF THE INVENTION

Field of the Invention

The present invention relates to a galvanometer scanner.

BACKGROUND OF THE INVENTION

A galvanometer scanner (Patent Literature 1 and the like) is used as irradiation position control means for irradiating light such as laser beam to a desired position. A typical galvanometer scanner is composed of an operation portion (rotor) having a scan mirror capable of reflecting light at the tip thereof and a fixed portion (stator) for rotatably supporting a rotary shaft in the operation portion. Such a galvanometer scanner can be applied to various fields such as a lamination molding apparatus (Patent Literature 2), a laser processing apparatus (Patent Literature 3), an optical image measuring apparatus (Patent Literature 4), an image display apparatus (Patent Literature 5) an image capturing system (Patent Literature 6), etc.

PRIOR ART DOCUMENTS

Patent Literature

[Patent Literature 1] JP 5705390
[Patent Literature 2] JP Publication 2016-186129
[Patent Literature 3] JP Publication 2012-121038
[Patent Literature 4] JP 5275880
[Patent Literature 5] JP Publication 2009-244796
[Patent Literature 6] JP 5729622

SUMMARY OF INVENTION

Technical Problem

By the way, when the operation portion is driven at a high speed in order to displace the scan mirror to a desired angle in the galvanometer scanner, a problem occurs that a force is generated between the operation portion and fixed portion bearing the operation portion, and then vibration is generated. For example, in a lamination molding apparatus, since it is generally operated at a frequency of several tens Hz to several hundred Hz, some vibration is caused at the galvanometer scanner and mechanical structure having the galvanometer scanner mounted thereon.

The present invention has been made by taking these circumstances into consideration. An objective of the present invention is to provide a galvanometer scanner configured to suppress vibration.

Means to Solve the Problem

According to the present invention, a galvanometer scanner, comprising: an operation portion having a rotary shaft; an inner sliding member configured to rotatably support the rotary shaft; a reaction force absorbing portion, provided outside the rotary shaft via the inner sliding member, configured to replace a force acting against the operation portion with an angular acceleration; an outer sliding member configured to rotatably support the reaction force absorbing portion; and a fixed portion provided outside the reaction force absorbing portion via the outer sliding member, is provided.

Effect of the Invention

In the galvanometer scanner according to the present invention, a reaction force absorbing portion bearing on an inner sliding member and outer sliding member respectively is provided between the rotary shaft of the operation portion and fixed portion. Thereby, the force acting between the operation portion and reaction force absorbing is replaced by angular acceleration. Owing to such a structure, the vibration can be suppressed.

Hereinafter, various embodiments of the present invention will be provided. The embodiments provided below can be combined with each other.

BRIEF DESCRIPTION OF THE DRAWINGS

FIG. 1 is a cross-sectional view schematically showing a galvanometer scanner 100 according to an embodiment of the present invention (however, an operation portion 200 is an end view).

DESCRIPTION OF THE PREFERRED EMBODIMENTS

Hereinafter, a galvanometer mirror according to an embodiment of the present invention will be described with reference to the drawings. Here, the characteristic matters shown in the embodiments can be combined with each other.

As shown in FIG. 1, a galvanometer scanner 100 is composed of an operation portion 200 (rotor), reaction force absorbing portion 300, and fixed portion 400 (stator).

The operation portion 200 includes a scan mirror 210, rotary shaft 220, and a magnet 230. The operation portion 200 is rotatable with the rotary shaft 220 serving as a central axis of rotation. The scan mirror 210 is a mirror deflecting the incident light. The scan mirror 210 is connected to one end on the front side of the rotary shaft 220. Here, the right side in FIG. 1 is defined as the front side, and the left side thereof is defined as the rear side. A mirror mount 240 connects the scan mirror 210 to the rotary shaft 220. A mount retainer 250 fixes the mirror mount 240 to the rotary shaft 220 in a state in which the clasp 260 is inserted. The magnet 230 is fixed to the rotary shaft 220 and is positioned between inner sliding members 350 and 360.

A reaction force absorbing portion 300 includes an inner housing 310 and a coil 320. In addition, an iron core 330 may be provided. The coil 320 is provided around the magnet 230. The iron core 330 is provided around the coil 320. When an electric current flows from a power source (not shown) to the coil 320 via a lead wire (not shown), the coil 320 generates an electromagnetic force or a Lorentz force. Thereby, a rotational torque for rotating the magnet 230 is generated. The operation portion 200 is rotated by the rotational torque acting on the magnet 230.

An inner housing 310 houses the magnet 230, the coil 320 and iron core 330 therein. The inner housing 310 has an inner space 311 for rotating the magnet 230 of the operation portion 200. Inner slide members 350 and 360 are, for example, bearings rotatably supporting the rotary shaft 220. The inner sliding member 350 is provided at the front end of an inner space 311 of the inner housing 310. The inner sliding member 360 is provided at the rear end of the inner space 311 of the inner housing 310. With such a configuration, the rotary shaft 220 can rotate.

A fixed portion 400 includes an outer housing 410. The outer housing 410 has outer sliding members 450, 460 rotatably supporting the reaction force absorbing portion 300 in its inner space 411. The outer sliding members 450, 460 are, for example, bearings. The outer sliding member 450 is provided at the front end of an inner space 411. The outer sliding member 460 is provided at the rear end of the inner space 411. With such a configuration, the reaction force absorbing portion 300 can rotate.

The galvanometer scanner 100 is used in a state in which an angle detector 500 (encoder) for detecting the rotation angle of the rotary shaft 220 is attached. The angle detector 500 is composed of a disk 510 fixed to the rear end of the rotary shaft 220 and a detector 520 fixed to the rear end of the outer housing 410. Various types such as optical type and magnetic type can be applied to the angle detector 500. That is, in the case where the angle detector 500 is the optical type, a plurality of slits are provided in the disk 510, and a light emitting element and light receiving element are provided in the detector 520. The angle detector 500 detects the rotation angle of the rotary shaft 220 with respect to the fixed portion 400 by detecting, by the light receiving element, the light passing through the slit of the disk 510 after being emitted from the light emitting element. Further, in the case where the angle detector 500 is a magnetic type, the outer peripheral surface of the disk 510 is magnetized alternately to the S pole and N pole, the detector 520 is provided with a magnetic field detection element. Thereby, detecting the change of the magnetic field with the magnetic field detecting element, the rotation angle of the rotary shaft 220 with respect to the fixed portion 400 is detected.

As described above, the galvanometer scanner 100 according to the embodiment has a configuration in which the reaction force absorbing portion 300 is rotatably supported by the fixed portion 400 including the outer sliding members 450 and 460. According to such a configuration, the force acting between the rotary shaft 220 of operation portion 200 and the reaction absorbing portion 300 does not affect the fixed portion 400, and is replaced by angular acceleration of the rotary shaft 220 and reaction force absorbing portion 300 bearing the rotary shaft 220, so that the vibration of the fixed portion 400 can be suppressed. Furthermore, in an apparatus including the galvanometer scanner 100, the fixed portion 400 is fixed to the mechanical structure of the device, but by preventing the vibration of the fixed portion 400, vibration transmission to the mechanical structure can also be effectively suppressed.

As described above, the galvanometer scanner 100 according to the embodiment is configured to detect the rotation angle of the rotary shaft 220 with respect to the fixed portion 400, not the reaction force absorbing portion 300 bearing the rotation angle. Therefore, even when the structure is provided via two bearings, it is possible to control the scan mirror 210 to a desired angle.

As an example of an apparatus including the galvanometer scanner 100, a lamination molding apparatus forming a desired molded object by irradiating a laser beam at a desired position and thereby sintering the material powder to form a plurality of sintered layers, can be performed.

Further, in performing the above-described lamination molding apparatus, a general galvanometer scanner including a rotary shaft and fixed portion rotatably supporting the rotary shaft may be used in place of the galvanometer scanner 100. However, the mechanical structure of the lamination molding apparatus on which the galvanometer scanner is installed requires a structure rotatably supporting the fixed portion of the galvanometer scanner. Also, it should be noted that the rotation angle of the rotary shaft with respect to the mechanical structure can be detected. Of course, the present invention is not limited to the lamination molding apparatus, and the same applies to the case of implementing, for example, a laser processing apparatus, laser measuring apparatus, image display apparatus, image capturing system, and the like.

Although embodiments of the present invention and modifications thereof have been described, they have been presented as examples and are not intended to limit the scope of the invention. These novel embodiments can be implemented in various other forms, and various omissions, substitutions, and changes can be made without departing from the spirit of the invention. These embodiments and modifications thereof are included in the scope and gist of the invention and are included in the invention described in the claims and the equivalent scope thereof.

EXPLANATION OF SYMBOLS

100: galvanometer scanner
200: operation portion
210: scan mirror
220: rotary shaft
230: magnet
240: mirror mount
250: mount retainer
260: clasp
300: reaction force absorbing portion
310: inner housing
311: inner space
320: coil
330: iron core
350: inner sliding member
360: inner sliding member
400: fixed portion
410: outer housing
411: inner space
450: outer sliding member
460: outer sliding member
500: angle detector
510: disk
520: detector

What is claimed is:

1. A galvanometer scanner, comprising:
an operation portion having a rotary shaft;
an inner housing having at least a part of the rotary shaft housed therein;
an inner sliding member configured to rotatably support the rotary shaft, the inner sliding member being provided between the rotary shaft and the inner housing;
a reaction force absorbing portion having the inner housing;
an outer housing having at least a part of the reaction force absorbing portion housed therein:
a fixed portion having the outer housing; and
an outer sliding member configured to rotatably support the reaction force absorbing portion, the outer sliding member being provided between the outer housing and the inner housing.

2. The galvanometer scanner of claim 1, wherein the reaction force absorbing portion is configured to replace a force acting against the operation portion with an angular acceleration.

* * * * *